(12) United States Patent
Babbage et al.

(10) Patent No.: US 9,950,750 B2
(45) Date of Patent: Apr. 24, 2018

(54) COLLAPSIBLE TAILGATE ARRANGEMENT AND RELATED METHOD

(71) Applicant: FORD GLOBAL TECHNOLOGIES, LLC, Dearborn, MI (US)

(72) Inventors: Jason Michael Babbage, Allen Park, MI (US); Henry W. Hausler, Manchester, MI (US); Danielle Marie Rodriguez, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/151,096

(22) Filed: May 10, 2016

(65) Prior Publication Data

US 2017/0327158 A1 Nov. 16, 2017

(51) Int. Cl.
*B62D 33/027* (2006.01)
*B60D 1/01* (2006.01)
*B60J 5/10* (2006.01)

(52) U.S. Cl.
CPC ......... *B62D 33/0273* (2013.01); *B60D 1/015* (2013.01); *B60J 5/108* (2013.01); *B62D 33/0276* (2013.01)

(58) Field of Classification Search
CPC .. B60J 5/108; B62D 33/0273; B62D 33/0276; B60D 1/015
See application file for complete search history.

(56) References Cited

U.S. PATENT DOCUMENTS

| | | | |
|---|---|---|---|
| 4,165,118 A | 8/1979 | Jensen | |
| 4,861,093 A | 8/1989 | Chapman | |
| 5,468,114 A | 11/1995 | Hickerson | |
| 5,486,032 A | 1/1996 | Reed et al. | |
| 5,516,178 A | 5/1996 | Grant | |
| 5,853,116 A | 12/1998 | Schreiner | |
| 6,966,596 B1 | 11/2005 | Rinehart | |
| 8,348,325 B2 | 1/2013 | Hausler et al. | |
| 2009/0096243 A1* | 4/2009 | Patton, Jr. ......... | B62D 33/0273 296/51 |
| 2012/0126564 A1* | 5/2012 | Hausler ............. | B62D 33/0273 296/62 |

FOREIGN PATENT DOCUMENTS

CA 1307018 C 9/1992

* cited by examiner

*Primary Examiner* — D Glenn Dayoan
*Assistant Examiner* — Melissa A Black
(74) *Attorney, Agent, or Firm* — Jason Rogers; King & Schickli, PLLC (57) ABSTRACT

An apparatus for partially covering an end of a vehicle bed includes a tailgate comprising a frame adapted for moving between a raised position and a lowered position relative to the vehicle bed. The frame supports at least one member adapted for moving along the frame to at least partially expose the end of the vehicle bed without moving the frame to the lowered position. A plurality of movable members in the form of panels may be provided, along with actuators for rotating and/or moving one or more of the panels between the raised and collapsed configuration. A related method is also disclosed.

20 Claims, 11 Drawing Sheets

COLLAPSIBLE TAILGATE ARRANGEMENT AND RELATED METHOD

TECHNICAL FIELD

This document relates generally to the motor vehicle field and, more particularly, to a collapsible tailgate arrangement for use in connection with a vehicle bed.

BACKGROUND

Utility vehicles such as pickup trucks typically include a bed that may be used for the storage of various objects, which may be associated with a tailgate that may be lowered from a raised position for covering the otherwise open trailing end of the bed. Such vehicles are often associated with towing equipment positioned in the bed, such as "fifth wheel" hitches or other types of hitch mounts. While useful for towing particularly large trailers, the tailgate in the fully raised condition may interfere with the towing equipment. Lowering the tailgate to accommodate the hitch assembly of the trailer is generally undesirable, as it renders the bed useless for securely storing any objects. Removing the tailgate is a time-consuming and cumbersome operation, and requires storing it when not in use.

Thus, a need is identified for a tailgate arrangement that can be adjusted to accommodate a hitch assembly for associating with a vehicle bed without compromising the ability to store objects in the bed and without the need for wholesale removal of the tailgate from the vehicle.

SUMMARY

In accordance with the purposes and benefits described herein, an apparatus for at least partially covering an end of a vehicle bed is disclosed. The apparatus includes a tailgate comprising a frame adapted for moving between a raised position and a lowered position relative to the vehicle bed. The frame supports at least one member adapted for moving along the frame to at least partially expose the end of the vehicle bed without moving the frame to the lowered position.

In one embodiment, the at least one member is mounted to the frame for rotating between a closed position in alignment with the frame and an open position transverse to the frame. The member may further include an actuator for moving the at least one member along the frame, and/or for rotating the at least one member between the open and closed positions. In one embodiment, the actuator comprises an endless loop connected to a handle associated with the frame for raising and lowering the at least one member. The apparatus may also include at least one connector associated with the member, and a guide for guiding the connector to lower the at least one member and at least partially expose the end of the vehicle bed.

In this or another embodiment, the tailgate comprises a plurality of members adapted for moving along the frame between a raised position and a lowered position. Each member may be mounted to the frame for rotating between a closed position in alignment with the frame and an open position transverse to the frame. An actuator is provided for moving each member between the raised position and the lowered position, and/or rotating each member between the open and closed positions. The frame may include spaced side portions mounted for pivoting movement relative to the vehicle bed, and the at least one member may extend between the spaced side portions.

As can be appreciated, the invention as disclosed may extend to a vehicle including the apparatus. In one particular implementation, the vehicle includes a hitch mount in the vehicle bed. A trailer also includes a hitch assembly for connecting to the hitch mount when the at least one member of the tailgate is in a lowered position such that the vehicle bed is at least partially exposed.

According to a further aspect of this disclosure, an apparatus for selectively and at least partially covering an end of a vehicle bed is provided. The apparatus includes a tailgate with a plurality of panels for closing the end of the vehicle bed. Each panel is adapted for rotating from an upright condition to a rotated condition and for moving in a vertical direction from a raised configuration to a collapsed configuration to at least partially expose the vehicle bed. The apparatus may include one or more actuators for rotating and moving the panels to cause them to collapse.

This disclosure also pertains to a method of covering an opening for accessing a vehicle bed. The method comprises providing a tailgate for covering the opening in a raised condition and for exposing the opening in a lowered condition. A portion of the tailgate is movable in a vertical direction in a plane of an opening for partially exposing the opening without moving the tailgate to the lowered condition. The method may further include the steps of rotating the portion of the tailgate and then lowering the portion along the tailgate to at least partially expose the opening.

In the following description, there are shown and described several preferred embodiments of the collapsible tailgate arrangement. As it should be realized, the arrangement is capable of other, different embodiments and its several details are capable of modification in various, obvious aspects all without departing from the collapsible tailgate arrangement as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the collapsible tailgate arrangement and, together with the description, serve to explain certain principles thereof. In the drawing figures.

Reference will now be made in detail to the present preferred embodiments of the collapsible tailgate arrangement, examples of which are illustrated in the accompanying drawing figures.

DETAILED DESCRIPTION

Figure 1:
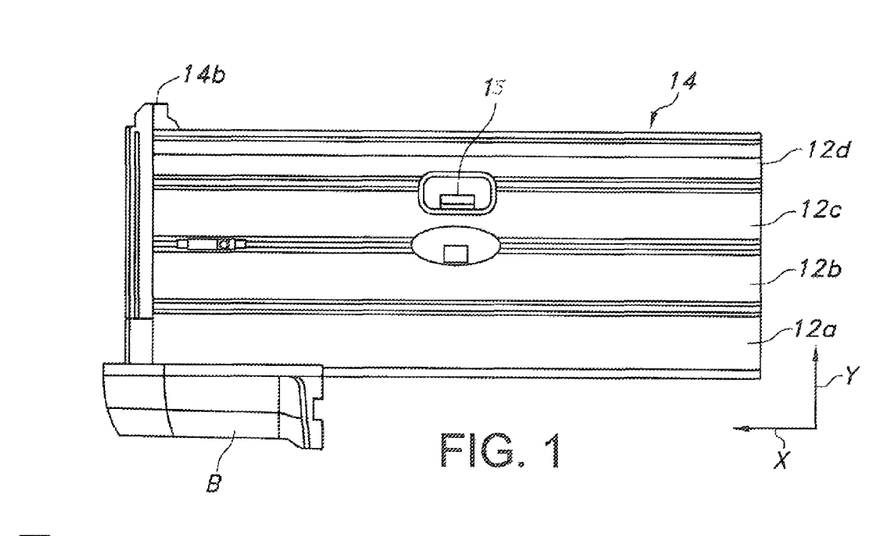
FIG. 1 is a partially cutaway view of a collapsible tailgate arrangement taken from the rear of a vehicle.
Figure 2:
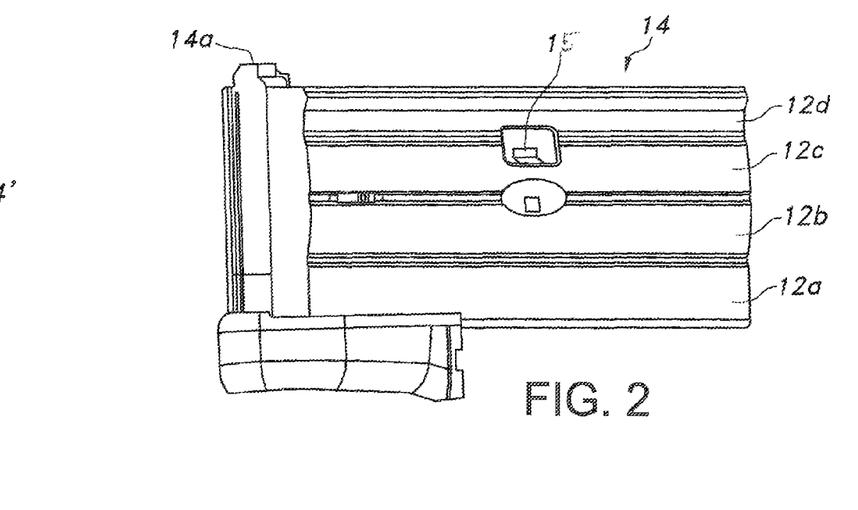
FIG. 2 is a rear view of the tailgate of FIG. 1.
Figure 3:
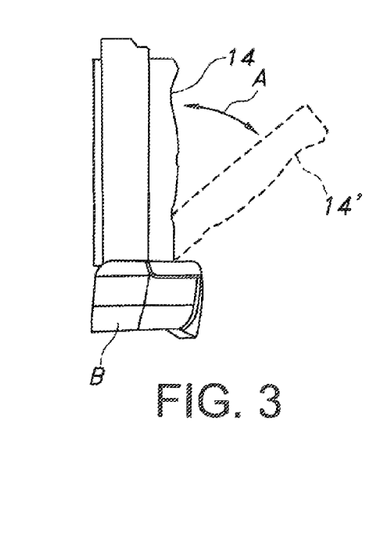
FIG. 3 is an end view of the tailgate of FIG. 1.
Figure 10:
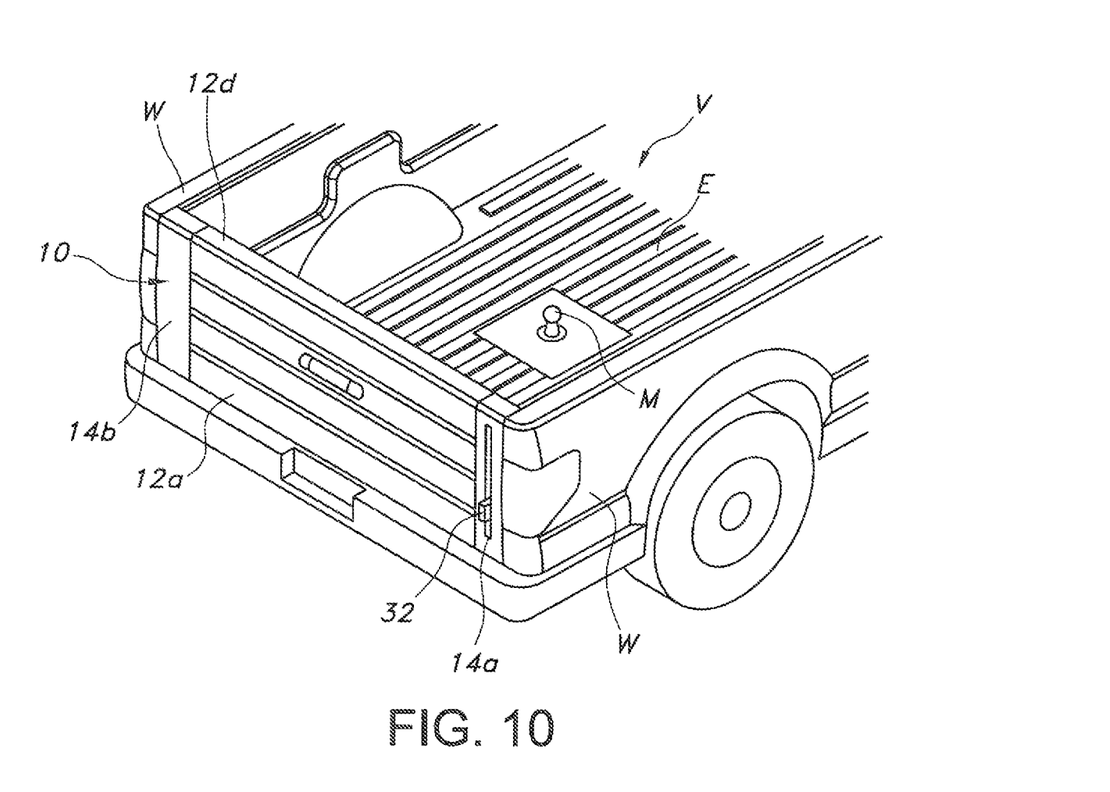
FIGS. 10, 11, and 12 illustrate one possible mode of use of the collapsible tailgate arrangement.

Reference is now made to FIGS. 1 and 2, which illustrate one possible embodiment of a collapsible tailgate 10 for a vehicle or truck bed. As shown in FIG. 1, the tailgate 10 includes one or more vertically movable portions or members, such as four elongated slats or panels 12a-12d. The panels 12a-12d may be connected to a support in the form of a frame 14, which includes a first side portion 14a and a second side portion 14b between which the panels extend in a direction aligned with a longitudinal axis X. The frame 14 may be adapted for being raised and lowered relative to the vehicle sidewalls W and bumper B, as indicated in FIGS. 3 and 10, as with a conventional tailgate arrangement on a pick-up truck (note position 14' and action arrow A). A latch 15 may also be provided to latching the tailgate frame 14 to the sidewalls W in an upright condition, and for allowing it to be lowered (see FIGS. 10 and 11). A more complete description of a pivoting tailgate may be found in U.S. Pat. No. 8,348,325, the disclosure of which is incorporated herein by reference.

Figure 4:
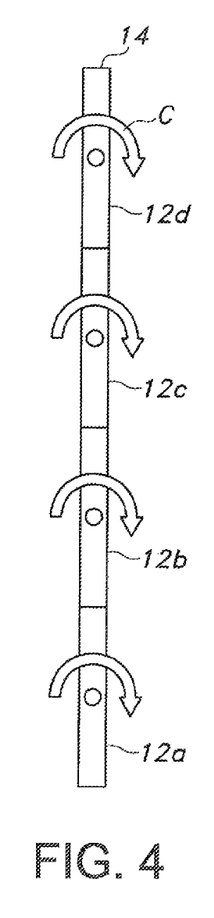
FIGS. 4, 5, and 6 are schematic views illustrating the collapsible tailgate arrangement.

According to one aspect of the disclosure, one or more of the panel(s) may be adapted for rotating and then moving along the frame 14 from a raised position to a lowered position, even when the frame remains in the upright or closed position covering the rear end of the vehicle bed E. Specifically, with reference to the schematic view of FIG. 4, it can be understood that each panel 12a-12d may be mounted for rotation relative to the frame 14 (or side portions 14a, 14b in particular) about the longitudinal axis X of the panel (note action arrow C). Once rotated, it can also be appreciated that the panels 12a-12b may move independently relative to the frame 14 between a raised position (FIG. 5) to a lowered or collapsed position (FIG. 6), and then returned to the raised position (note double headed action arrows D in FIG. 5). As will be understood upon reviewing the description that follows, this allows for the height of the intermediate portion of the tailgate 10 (that is, between side frame portions 14a, 14b) to be selectively adjusted without raising, lowering, or removing the tailgate 10. As can be appreciated, and as outlined further in the description that follows, this clears the way for the easy and efficient installation of a hitch assembly to a hitch mount in the bed of the vehicle or truck in a more expedient and efficient manner that heretofore possible with a conventional tailgate.

An embodiment of an actuator for causing movement of the panels 12a-12d in the desired manner is shown with reference to FIGS. 7 and 7a-7d. In this embodiment, the actuator is a manually operable one, and includes a first actuator 16 for rotating the panels 12a-12d between an open position and a closed position, and a second actuator 18 for moving one or more of the panels between a raised position and a lowered position. As will be better understood upon reviewing the description that follows, the actuators 16, 18 may work in concert to achieve the desired partial exposure for the end of the vehicle bed E without lowering the entire tailgate 10, yet it remains fully operational as a result of the provision of the support frame 14 that may move independently of the panels 12a-12d.

Taking the first actuator 16 first, it includes a spindle 20 rotatably mounted within the side portion 14a of the frame 14. A gearing arrangement may be provided in a gearbox 22, which is connected to and provides support for each panel 12a (only one gearbox shown in FIG. 7 for purposes of clarity). Specifically, the gearbox 22 may be connected to the spindle 20, and may move in a sliding fashion along an axis Y transverse to the longitudinal axis X (the vertical direction in the illustrated version). The spindle 20 may be connected to a lever 26, which may pass through an opening 14c in the side frame portion 14a for being manipulated by a user.

Each gearbox 22 is adapted for translating the rotation of the spindle 20 about the transverse axis Y to rotation of an associated panel 12a connected to it about the longitudinal axis X. As shown in FIG. 7c, the spindle 20 may support a first gear 28 (such as a full or partial spur gear) for engaging a second gear 30 (such as a worm gear) connected to the panel 12a by a connector 31. The connector 31 may simply be an integral part with the gear 30, as shown, and fixed to the corresponding end of the panel 12 associated with the side frame portion 14a.

The connector 31 may engage a guide for guiding the movement of the associated panels 12a-12d in a direction aligned with the transverse axis Y (the vertical direction, as shown). This guide may take the form of an elongated opening 14d or slot in the side frame portion 14a through which the connector 31 passes to connect to the corresponding panel, such as panel 12a. As can be appreciated, this opening 14d is sized so as to not interfere with the rotation of the connector 31 or movement of it in the intended manner. The opposite end of each panel 12a-12b may simply be connected to opposite frame side portion 14b by a similar connector passing through an opening to connect with a stationary guide so as to be capable of following the movement, but could also be actuated in a manner similar to that described herein.

In any case, rotation of the first gear 28 about transverse axis Y causes the associated panel 12a to rotate about the longitudinal axis X, moving it from a position aligned with frame 14 (that is, with a minor plane parallel to axis Y) to a position transverse with frame (that is, with a minor plane perpendicular to axis Y). For reasons better understood upon reviewing the description that follows, the spindle 20 may be provided with cutouts 20a, and first gear 28 may be provided with corresponding transverse projections 20b or keys. This form of engagement allows the rotation of the spindle 20 to rotate the first gear 28 in a positive fashion, while also allowing for sliding movement of the gearbox 22 along the transverse axis Y during the movement of the panels 12b-12d between the raised position closing the end of the vehicle bed E corresponding to the tailgate 10 and the lowered position exposing the bed.

Figure 7:
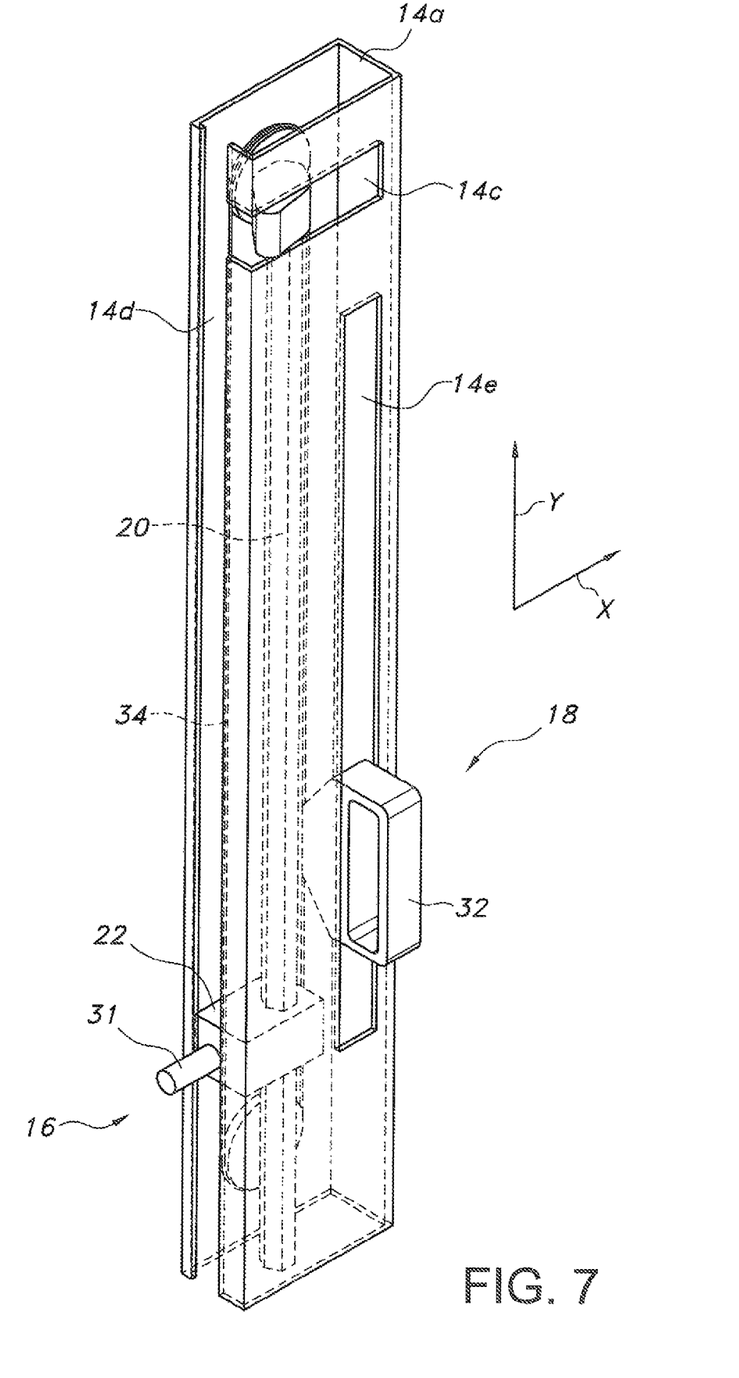
FIGS. 7 and 7a-7d illustrate one embodiment of an actuator for collapsing the tailgate.
Figure 7A:
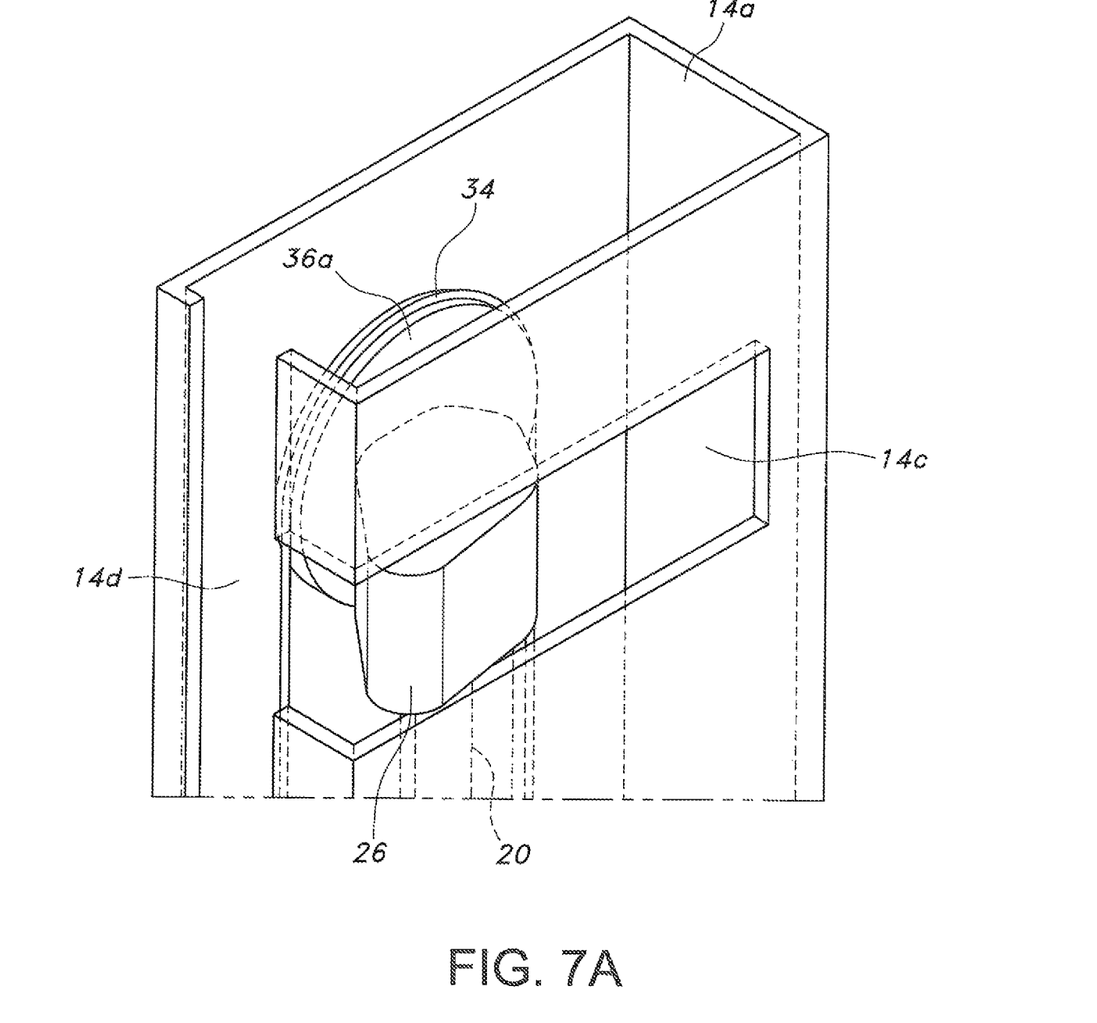
Figure 7B:
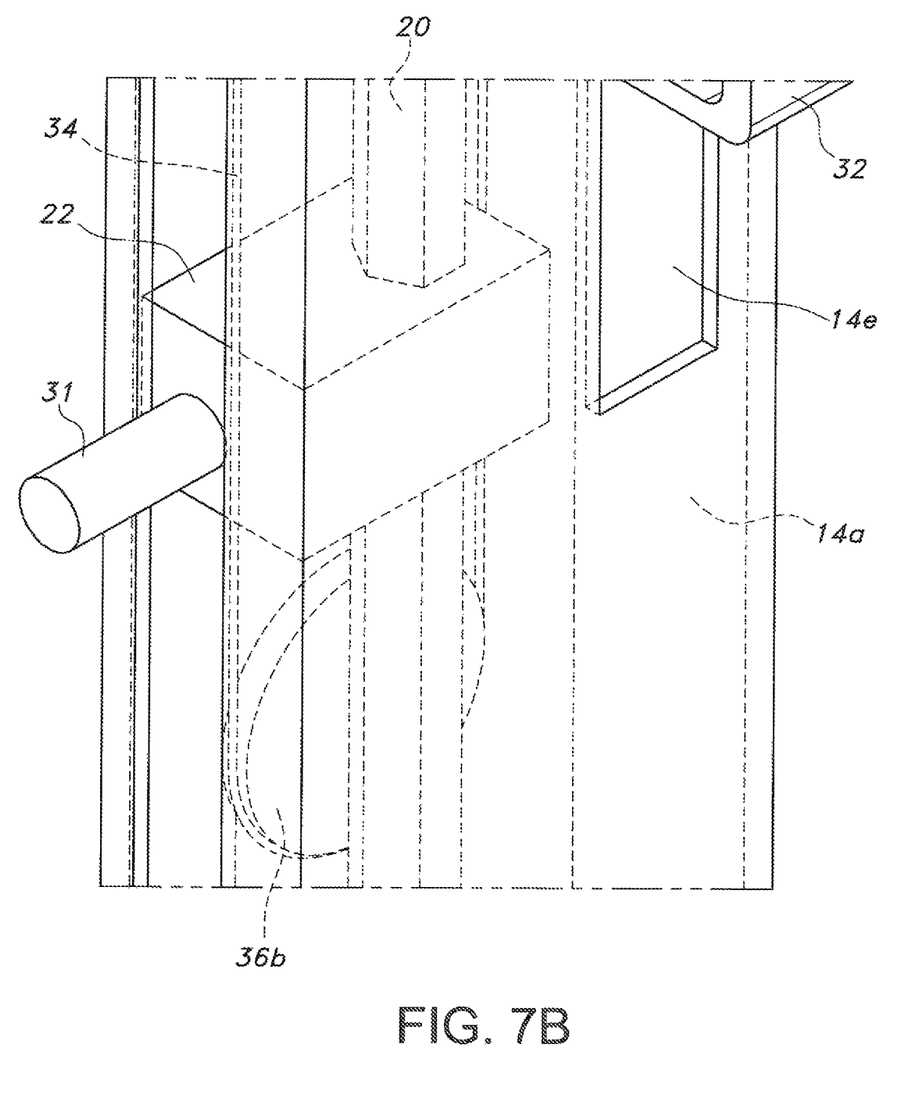
Figure 7C:
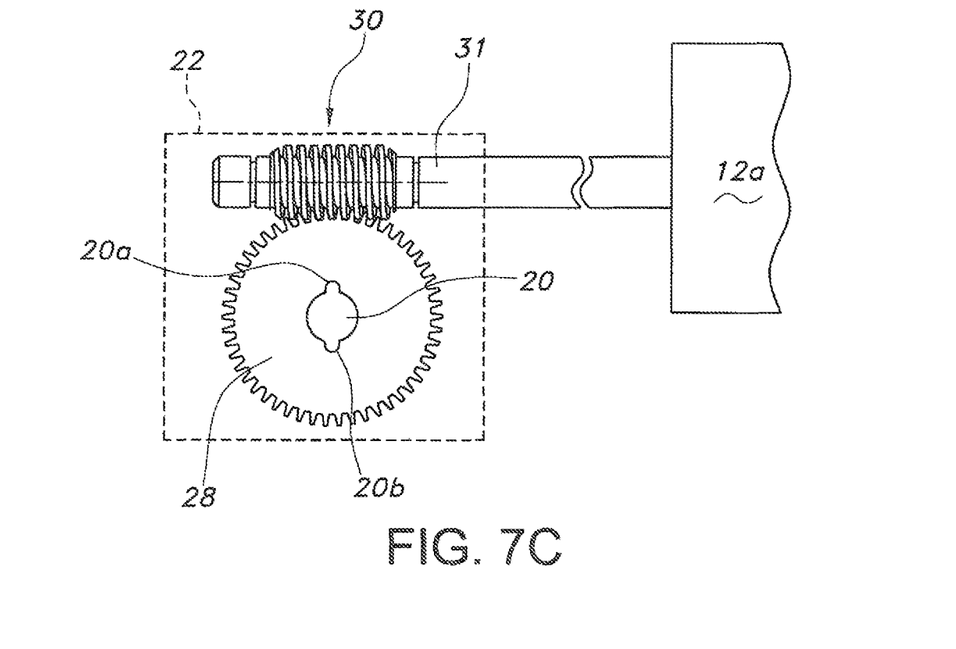
Figure 7D:
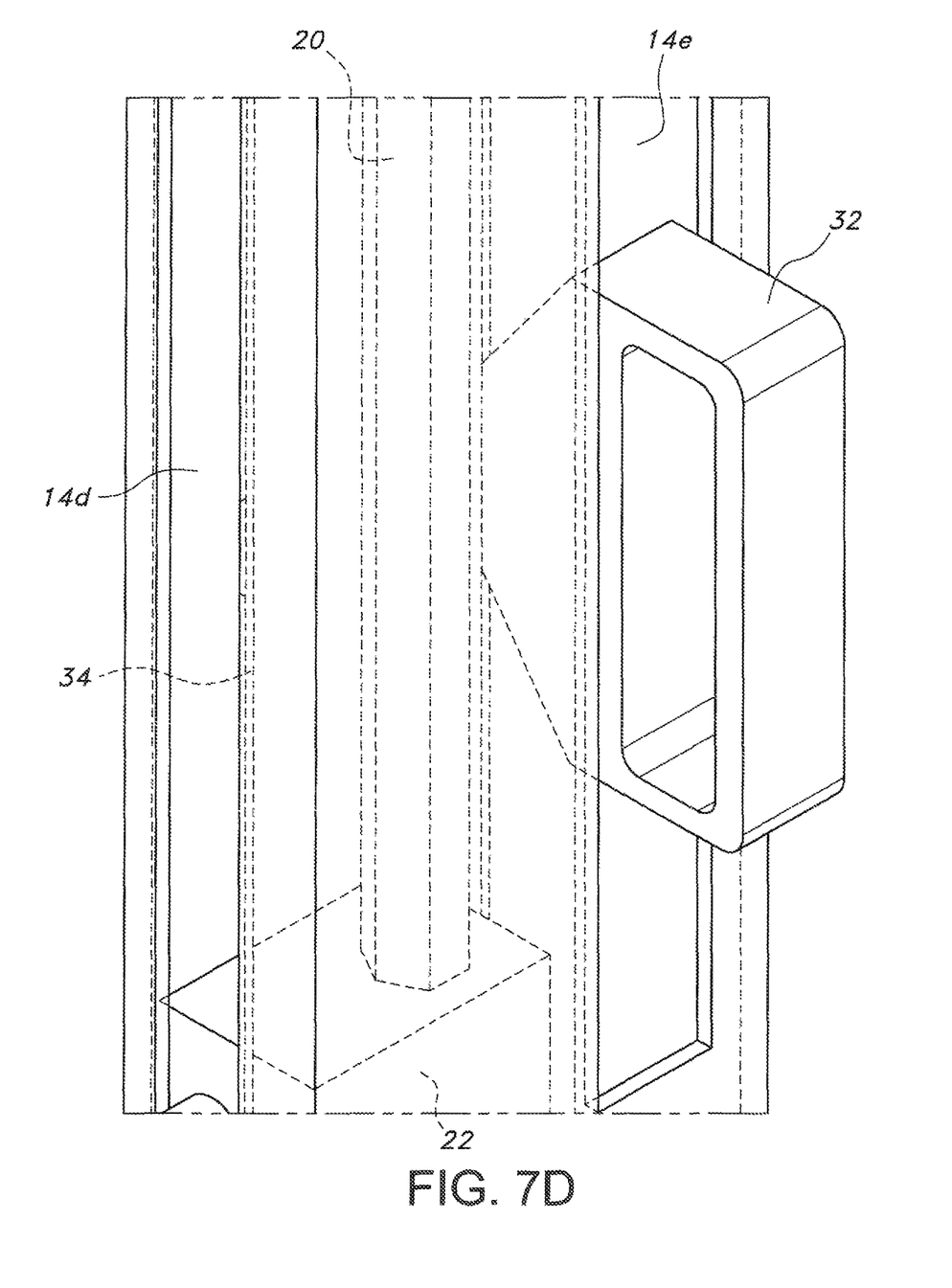

Turning now to the second actuator 18, and with reference to FIGS. 7 and 7d, it may include a handle 32 projecting through a cutout or opening 14e elongated in a direction aligned with the transverse axis Y. The handle 32 is connected to an endless loop 34 extending over pulleys 36a, 36b rotatably mounted in the side portion 14a of the frame 14. Thus, as the handle 32 is moved (raised and lowered), the loop 34 is caused to move to and fro relative to the frame 14, and side portion 14a in particular, in an opposite direction.

Figure 8:
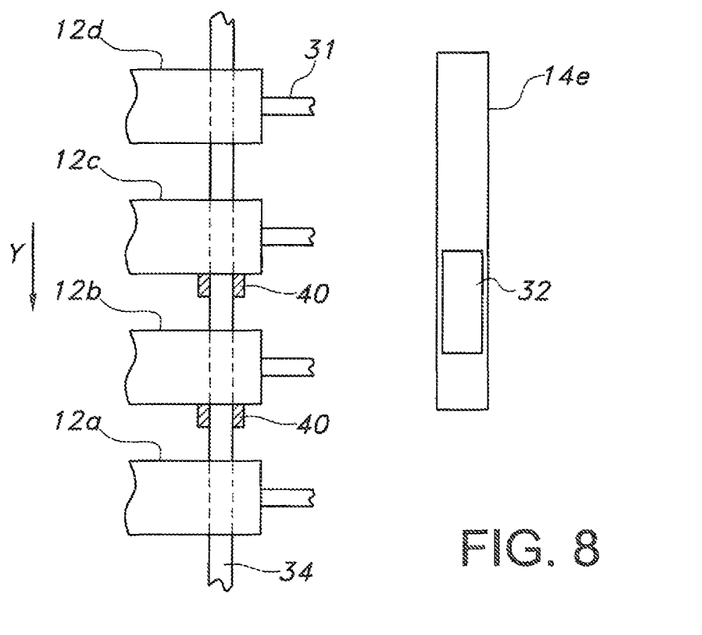
FIGS. 8 and 9 are side schematic views showing the tailgate in the raised and lowered or collapsed configurations.

As shown in FIG. 8, it can now be understood that the lowermost panel 12a may simply be arranged such that it does not engage the loop 34 and thus simply rotates relative to the frame 14 as a result of the manipulation of the spindle 20. The next adjacent panel or panels 12b, 12c are also not connected to the loop 34, but may be supported by lifters 40 connected thereto. The upper panel 12d is connected to the loop 34 for moving along the transverse (vertical) axis Y in response to the movement of the handle 32.

Figure 5:
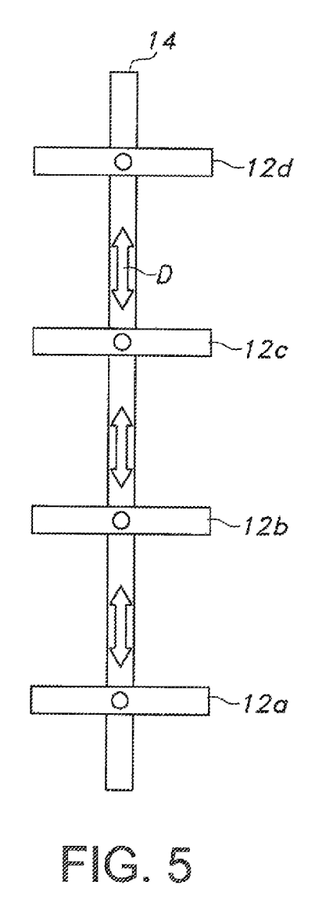
Figure 6:
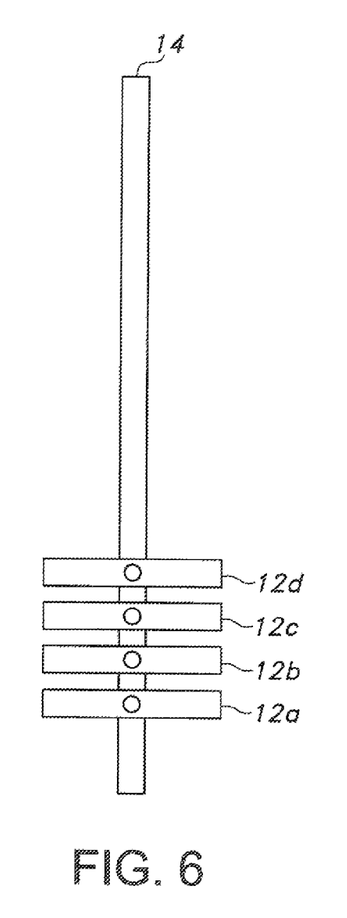
Figure 9:
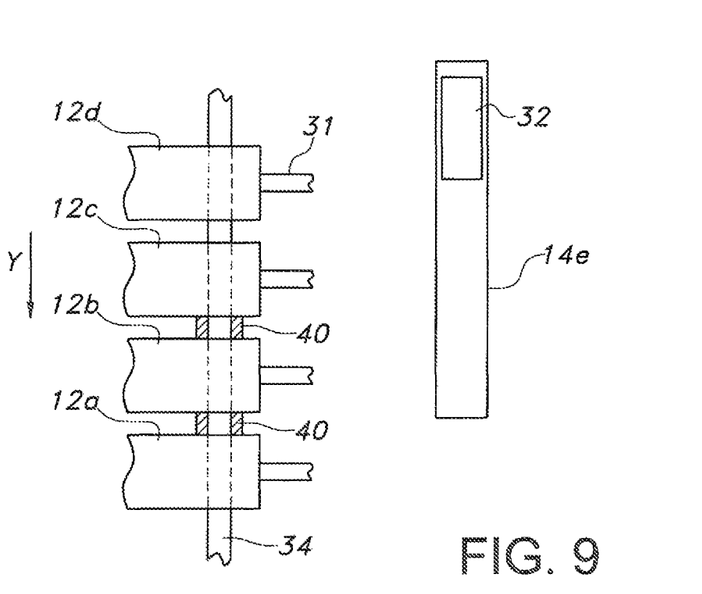

Thus, with reference to FIG. 9, it can be understood that movement of the handle 32 along the transverse axis Y in one direction causes movement of the upper panel 12d in the opposite direction as the result of the connection to endless loop 34. Specifically, in the illustrated embodiment, the movement of the handle 32 upwardly from the position shown in FIG. 7 causes the upper panel 12d when rotated as shown in FIG. 5 to move downwardly and engage the next adjacent panel 12c, which in turn engages panel 12b. As a result of the sliding engagement of the associated gearboxes 22, the panels 12a-12c thus move toward panel 12a to reach the collapsed configuration of FIG. 6, more fully exposing the space between frame side portions 14a, 14b.

Movement of the handle 32 in the opposite direction (vertically downward) thus raises the upper panel 12d and ultimately returns it to the initial or home position. The concurrent movement of lifters 40 connected to the loop 34 moves intermediate panels 12b and 12c along the transverse axis Y and back to the initial or home (expanded) position. Once the panels 12b-12d have returned to the position shown in FIG. 5, the first actuator 16 may be used to rotate the panels (including lower panel 12a) about the longitudinal axis X to assume the configuration shown in FIG. 4 and thereby close the tailgate 10 to cover the open end of the vehicle bed E.

Figure 11:
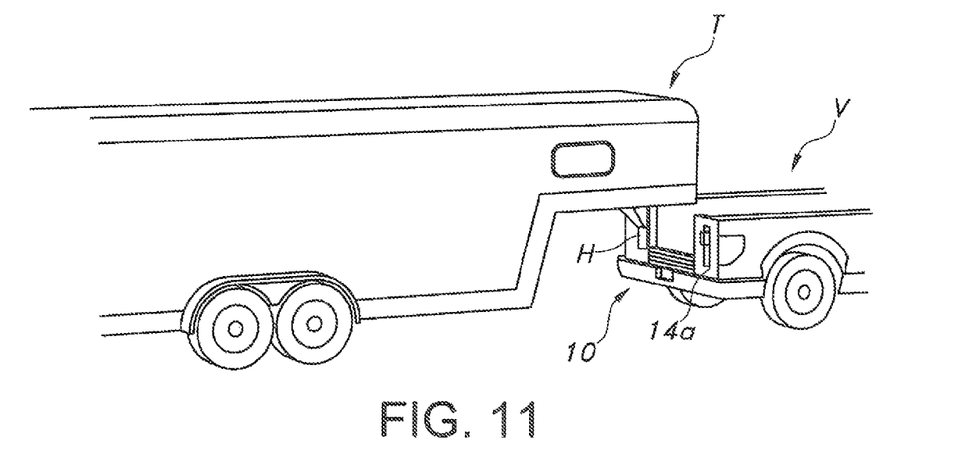
Figure 12:
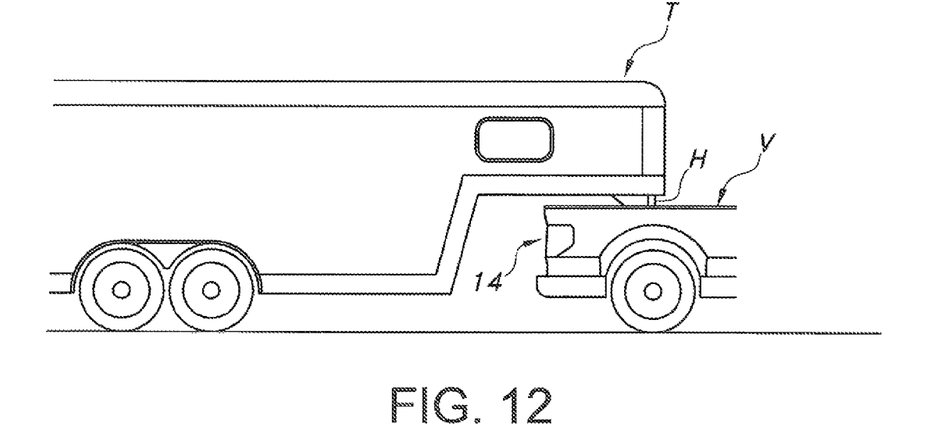

As shown in FIGS. 10-12, the collapsible tailgate 10 according to the disclosure may be used to accommodate a trailer T including a hitch assembly H for connecting with a hitch mount M in the vehicle or truck bed E. Specifically, one or more of the panels 12a-12c may be lowered to allow the assembly H to pass between the frame side portions 14a, 14b into position for engaging the hitch mount M. When the trailer T is disconnected, the panels 12a-12d may be returned to the home position for regular use of the tailgate 10 (which as noted above is adapted to be raised and lowered in a conventional manner).

Figure 13:
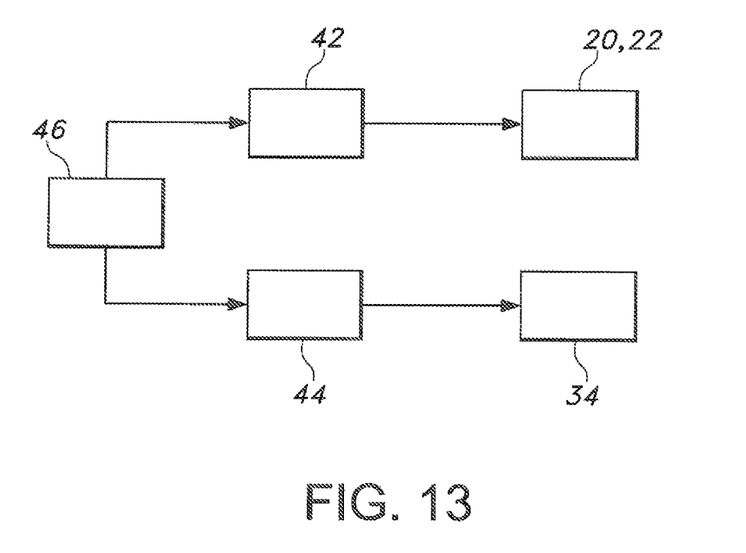
FIG. 13 is a schematic diagram showing a possible arrangement for a powered collapsible tailgate.

While a manual configuration is described, it can be appreciated that a powered arrangement may also be used. Specifically, as schematically illustrated in FIG. 13, the first actuator 16 may comprise a motor 42 for rotating the spindle 20, or the gearboxes 22 could simply be motorized. Likewise, a motor 44 could be provided for causing the loop 34 for move to and fro for raising and lowering the panels 12a-12d. A controller 46 may be provided anywhere on the vehicle V or perhaps even in a remote control for controlling the activation of motors 42, 44 and thus the collapsing of the members or panels 12a-12d, and ultimately cause their return to a home position with a fully closed tailgate 10, as shown in FIG. 1.

Although four panels 12a-12d are illustrated, it can be appreciated that fewer or more may be used. For instance, a single panel may be used for exposing all or a portion of the open end of the vehicle bed E. This single panel may be rotated by the first actuator 16 and caused to collapse and then return to the home or upright position by the second actuator 18. The panel or panels 12a-12d also need not fully rotate to a horizontal position relative to the frame 14, as shown, but instead could assume an skewed or angled configuration and simply cascade over one another when collapsed.

An aspect of the disclosure may also be pertain to a method of manipulating a tailgate 10 for enhanced use using the movable members, such as panels 12a-12d. The method may comprise moving one of the members or panels along the tailgate 10, which means that each member or panel moves relative to the side frame portions 14a, 14b from an upper to a lower position. In other words, the members or panels move in a generally linear fashion along the transverse axis Y, or in the vertical direction in the usual mode of operation, and without removing or bodily rotating the entire tailgate to a lowered position. The method may further include rotating the member or panel prior to the moving step, which as can be appreciated allows for the member or panel to collapse relative to an adjacent member or panel when present, and which member or panel would otherwise prevent the movement along the tailgate if the members or panels remained in a non-rotated condition.

In summary, numerous benefits are provided by the proposed arrangement for a collapsible tailgate 10. For example, the tailgate 10 may be raised or lowered in the conventional manner (FIG. 3), thus avoiding the creation of any interference with normal operation. Yet, the tailgate 10 may be manipulated to allow an object, such as a hitch assembly H, to pass through the corresponding opening without first removing the tailgate or any part of it, such as a two-sided support frame. This may be achieved by moving a portion of a tailgate 10 associated with the vehicle bed E in a vertical direction within a plane of an opening for receiving the tailgate from a raised position to a lowered position. Consequently, efficiency of using the tailgate 10 and associated vehicle V or truck is greatly enhanced, especially in terms of performing a towing operation using a hitch mount M in the vehicle bed E.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for partially covering an end of a vehicle bed, comprising:
   a tailgate comprising a frame adapted for moving between a raised position and a lowered position relative to the vehicle bed, the frame supporting at least one member adapted for moving along a vertical axis of the frame in the raised position to at least partially expose the end of the vehicle bed without moving the frame to the lowered position.

2. The apparatus of claim 1, wherein the at least one member is mounted to the frame for rotating between a closed position in alignment with the frame and an open position transverse to the frame.

3. The apparatus of claim 1, further including an actuator for moving the at least one member along the frame.

4. The apparatus of claim 1, further including an actuator adapted for rotating the at least one member between an open position and a closed position.

5. The apparatus of claim 4, wherein the actuator comprises an endless loop connected to a handle associated with the frame for raising and lowering the at least one member vertically along the frame.

6. The apparatus of claim 1, further including:
   at least one connector associated with the member; and
   a guide for guiding the connector to lower the at least one member and at least partially expose the end of the vehicle bed.

7. The apparatus of claim 1, wherein the tailgate comprises a plurality of members, each adapted for moving along the frame between a raised position and a lowered position.

8. The apparatus of claim 7, wherein each member is mounted to the frame for rotating between a closed position in alignment with the frame and an open position transverse to the frame.

9. The apparatus of claim 8, further including an actuator for moving the members between the raised position and the lowered position.

10. The apparatus of claim 9, wherein the actuator is adapted for rotating each member between the open and closed positions.

11. The apparatus of claim 1, wherein the frame includes spaced frame portions mounted for pivoting movement relative to the vehicle bed, and the at least one member spans the spaced frame portions.

12. A vehicle including the apparatus of claim 1.

13. The vehicle of claim 11, further including a hitch mount in the vehicle bed and a trailer including a hitch assembly for connecting to the hitch mount.

14. An apparatus for partially covering an end of a vehicle bed, comprising:
 a tailgate comprising a plurality of panels for partially covering the end of the vehicle bed, each panel adapted for rotating from an upright condition to a rotated condition and for moving in a vertical direction from a raised configuration to a collapsed configuration to at least partially expose the vehicle bed.

15. The apparatus of claim 14, further including an actuator for rotating the panels.

16. The apparatus of claim 14, further including an actuator for collapsing the panels.

17. A vehicle including the apparatus of claim 14.

18. The vehicle of claim 14, further including a hitch mount in the vehicle bed and a trailer including a hitch assembly for connecting to the hitch mount.

19. A method of covering an opening for accessing a vehicle bed, comprising:
 providing a tailgate for covering the opening of the vehicle bed in a raised condition and for exposing the opening in a lowered condition, the tailgate including a portion rotatable from an upright to a non-upright condition;
 moving the portion in the non-upright condition in a vertical direction in a plane of the opening for partially exposing the opening.

20. The method of claim 19, further including the steps of rotating the portion of the tailgate within the opening and then moving the portion along the tailgate in a rotated condition to at least partially expose the opening.

* * * * *